United States Patent [19]

Krämer

[11] Patent Number: 5,159,765
[45] Date of Patent: Nov. 3, 1992

[54] APPARATUS FOR FLUIDIZING AND TRANSFERRING POWDERED MATERIAL

[75] Inventor: Erich Krämer, Michelau, Fed. Rep. of Germany

[73] Assignee: Metri Airfluid AG, Altstätten, Switzerland

[21] Appl. No.: 687,388

[22] Filed: Apr. 18, 1991

[30] Foreign Application Priority Data

Apr. 24, 1990 [DE] Fed. Rep. of Germany ....... 4013061

[51] Int. Cl.$^5$ ............................................. F26B 17/00
[52] U.S. Cl. ...................................... 34/57 R; 34/164
[58] Field of Search ..................... 34/10, 57 R, 57 A; 118/629-635; 427/28, 182

[56] References Cited

U.S. PATENT DOCUMENTS

| 1,893,562 | 1/1933 | Paasche . |
| 2,521,094 | 9/1950 | Rein . |
| 2,641,365 | 6/1953 | Lundeen . |
| 4,170,074 | 10/1979 | Heckman et al. ................... 34/57 A |

FOREIGN PATENT DOCUMENTS

| 0184994 | 6/1988 | European Pat. Off. . |
| 1777353 | 12/1972 | Fed. Rep. of Germany . |
| 8905926.3 | 11/1989 | Fed. Rep. of Germany . |
| 1588393 | 4/1981 | United Kingdom . |

Primary Examiner—Henry A. Bennet
Attorney, Agent, or Firm—Henry M. Feiereisen

[57] ABSTRACT

Apparatus for fluidizing powdered material within a container and transporting fluidized powder directly to a spray gun of an electrostatic powder coating plant includes a strainer basket which surrounds at a distance thereto the part of the suction and transport pipe immersing in the fluid bed, with the air outlet openings of the fluidizing unit being arranged laterally outside of the strainer basket and/or therebelow.

18 Claims, 11 Drawing Sheets

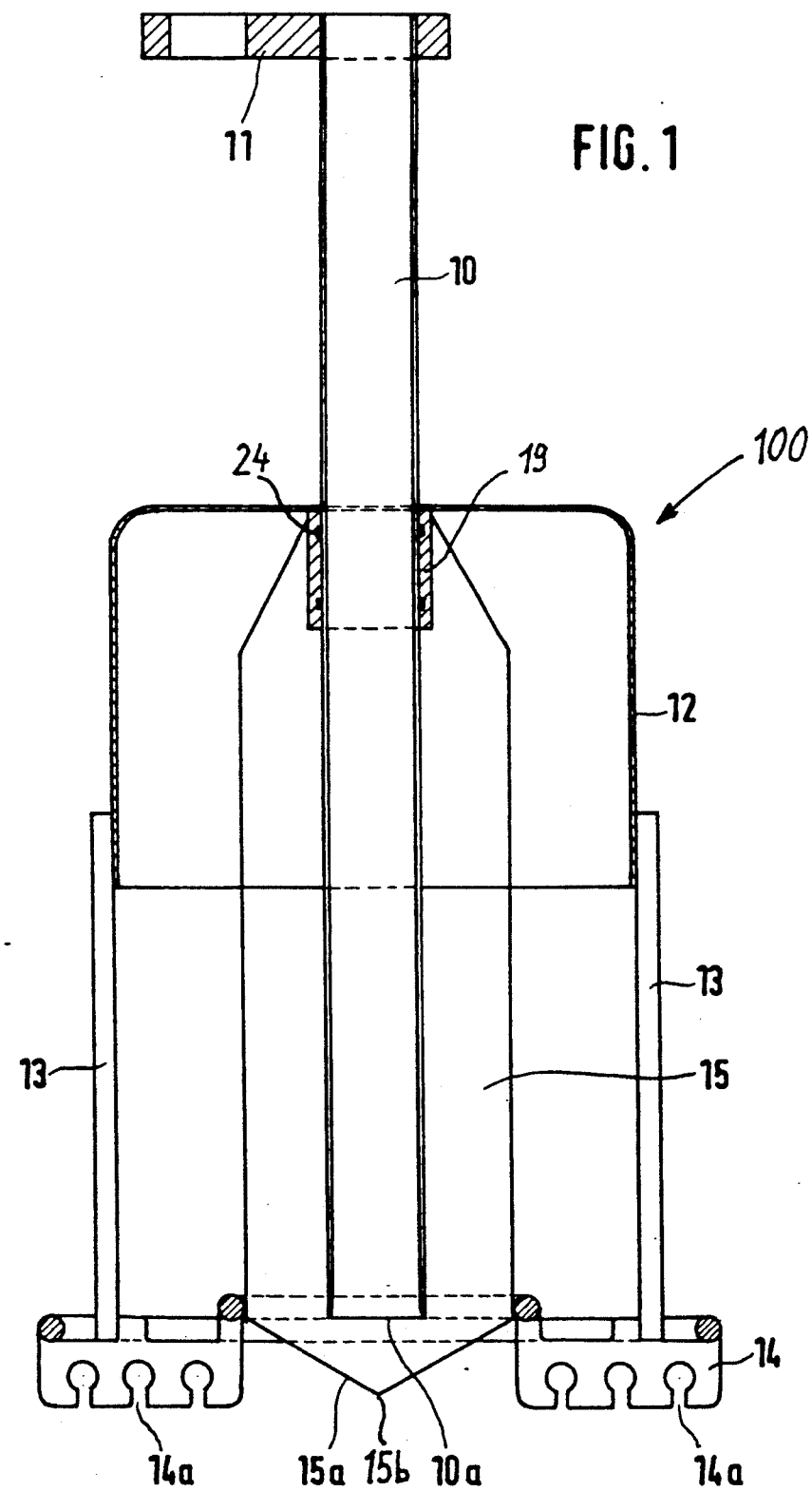

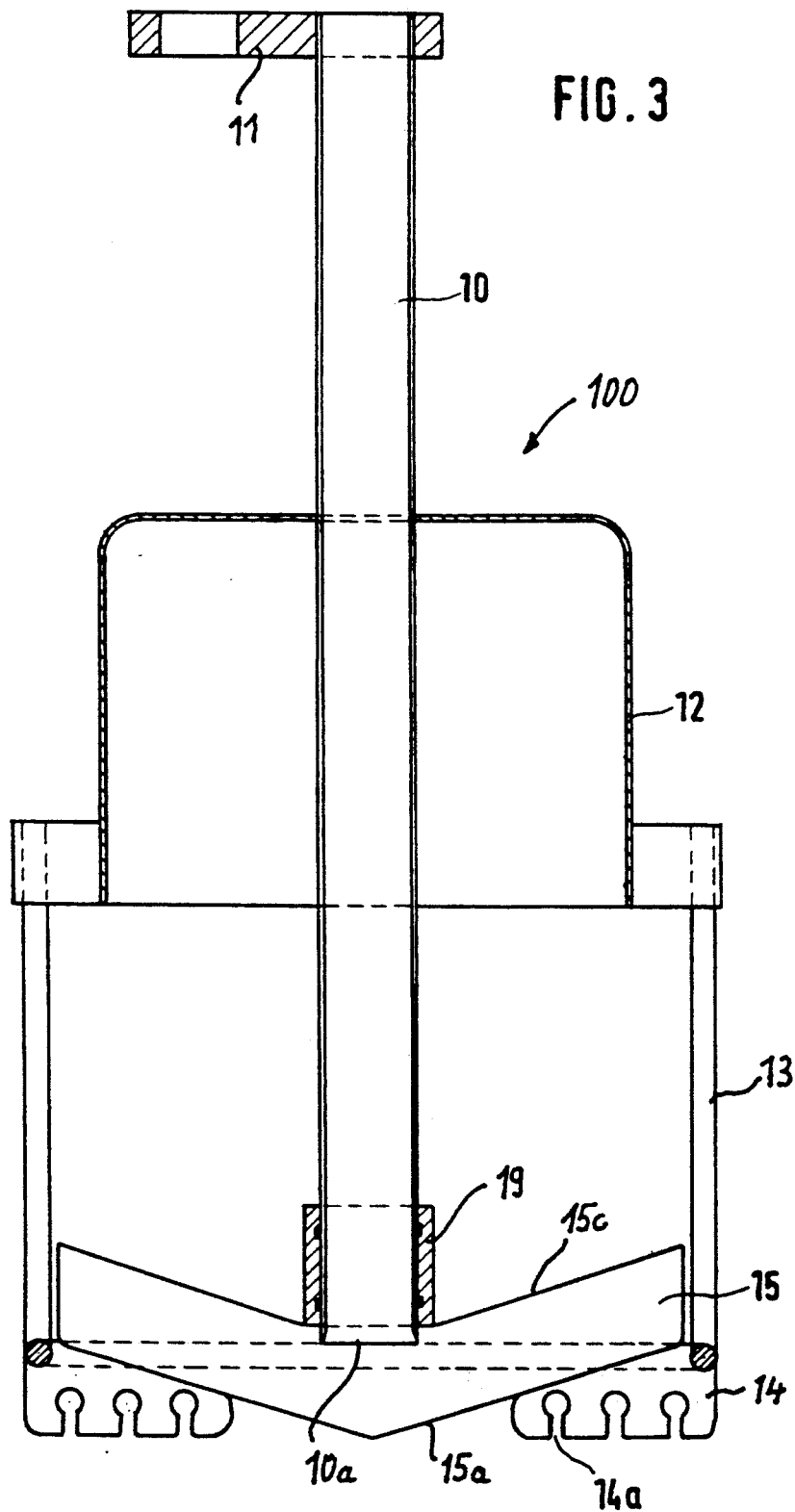

APPARATUS FOR FLUIDIZING AND TRANSFERRING POWDERED MATERIAL

BACKGROUND OF THE INVENTION

The present invention refers to an apparatus for fluidizing and transferring powdered or pulverulent material, and in particular to an apparatus for fluidizing powdered material contained in a container and transporting the fluidized powder directly to a spray gun of an electrostatic powder coating plant.

German utility model G 88 04 951 describes an apparatus of this type including a suction and transport pipe which is introduced into the container through its open top, and a compressed air pipe which is also introduced from above into the container and is provided with air openings for generating a locally limited powdery fluid bed. Such apparatus allows the conveyance and supply of powder directly from the original container to the spray gun without requiring any intermediate receptacle. Practice has shown however that this apparatus operates satisfactorily only when the powder is in perfect conditions. i.e. free of lumps, free of foreign particles and free of oversized powder particles which considerably exceed the predetermined average grain size. However, such conditions do no always prevail. For example, through a lengthy storage of the powder within the original container or temperature fluctuations formation of powder lumps may be encountered or particles of excessive grain size may be contained. The presence of such powder lumps or oversized powder particles results in an uneven coating of the workpiece which diminishes the quality especially when considering a finish coating. Practice has further shown that formation of undesired lumps is even more prevalent when employing the apparatus of the type disclosed in the German utility model G 88 04 951 for withdrawing and transferring powder which has been sprayed already i.e. recycled powder.

It was therefore suggested to interpose a filter of suitable fineness within the suction and transport pipe before the powder reaches the spray gun, e.g. at the suction port or within any other suitable location of the pipe. This proposal has proven fruitless because such a filter becomes clogged already after a short period. Further, it should be taken into account that, in general, an apparatus of this type operates at very low suction force so that an increased suction effect for freeing a filter from cloggings would considerably interfere with the withdrawal of powder from the fluid bed. Also, the installation of an intermediate chamber which contains a screening machine in the suction and transport pipe has proven to be too complicated as the powder which passes the screen of the screening machine has to be fluidized and transported again. The previously stated advantage of direct withdrawal and transport of powder from the original container to the spray gun and thus the advantage of reduced constructive design would be eliminated.

SUMMARY OF THE INVENTION

It is thus an object of the present invention to provide an improved apparatus for fluidizing and transferring powdered material obviating the afore-stated drawbacks.

In particular, it is an object of the present invention to provide an improved apparatus for withdrawing and transporting powdered material which ensures a separation of powder lumps and/or oversized particles before being fed to the spray gun and yet is of simple construction and great mobility.

These objects, and others which will become apparent hereinafter are attained in accordance with the present invention by a fluidizing and transport apparatus including a strainer basket which surrounds at a distance thereto the part of the suction and transport pipe being immersed in the powder fluid bed.

Preferably, the fluidizing unit includes a compressed air pipe which is provided with air outlet openings arranged laterally outside and/or below the strainer basket.

Through the provision of such a strainer basket which is immersed in the fluid bed generated thereabout, cloggings of the screen of the strainer basket are avoided even when using very fine-meshed screens because powder particles adhering externally upon the screen are instantaneously removed by the fluidized air and thus are prevented from adhering to and from clogging the wire mesh.

Thence, the transported powdered material is free of lumps and free of oversized particles as well as free of contaminations and lint. Cloggings are avoided even when using very fine screens and/or small amounts of fluidized air and/or low suction effect.

BRIEF DESCRIPTION OF THE DRAWING

The above and other objects, features and advantages of the present invention will now be described in more detail with reference to the accompanying drawing in which:

FIG. 1 is a schematic, partly sectional view of a first embodiment of a powder fluidizing and transferring apparatus in accordance with the present invention, illustrating a single suction and transport pipe enclosed by a strainer basket;

FIG. 3 is a schematic, partly sectional view of the powder fluidizing and transferring apparatus according to FIG. 1 with yet another modified strainer basket;

DETAILED DESCRIPTION OF PREFERRED EMBODIMENTS

Figure 1A:
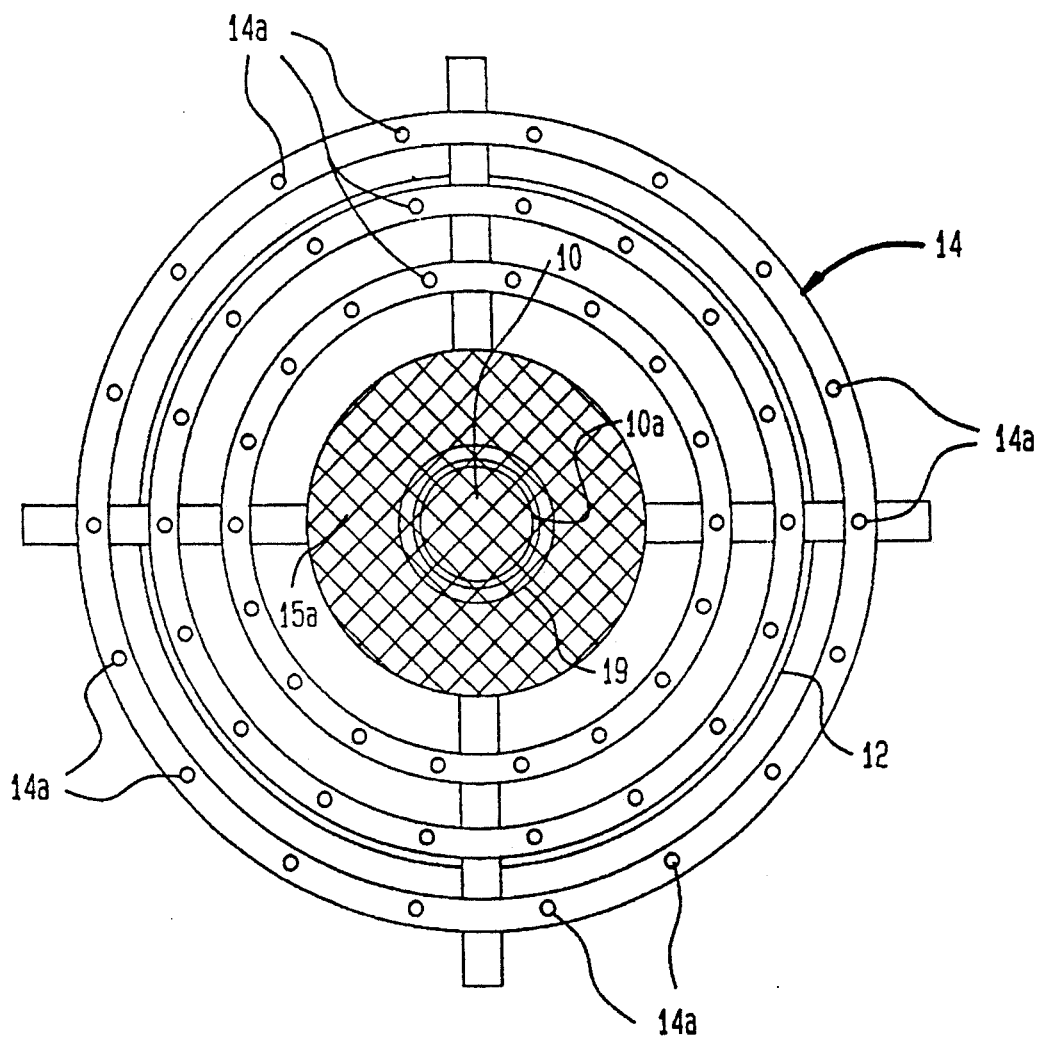
FIG. 1A is a bottom plan view of the powder fluidizing and transferring apparatus of FIG. 1.

Throughout all the Figures, the same or corresponding elements are always indicated by the same reference numerals.

Referring now to FIGS. 1 and 1A, there are shown a schematic, partly sectional view and a bottom plan view of a first embodiment of a powder fluidizing and transferring apparatus in accordance with the present invention, generally designated by reference numeral 100. The powder fluidizing and transferring apparatus 100 includes a single vertical suction and transport pipe 10, with its lowermost end defining a suction port 10a and with its upper end being mounted to a support plate 11 which is shown only schematically and may form part of a support arm of a not shown vertical lifting device. Although not shown in detail, the upper end of the pipe 10 is suitably connected to a further pipe, preferably a tubing, for direct attachment to a conventional powder spray gun.

Attached to the pipe 10 at a suitable location thereof is a downwardly open bell-shaped body 12 which is centrally traversed by the pipe 10 and carries several vertical compressed air pipes 13 about its outside. Although not shown in detail in the figures, persons skilled in the art will recognize that the compressed air pipes 13 are suitably connected at its upper end to a source of compressed air e.g. via a tubing. The lower end of the compressed air pipes 13 is connected to fluidizing rings 14 which extend concentric to each other and are provided with downwardly facing air outlet openings or perforations 14a for allowing compressed air to exit. It will be readily recognized that it is certainly sufficient to assign one pipe 13 for connection with the compressed air source, with the other pipes 13 merely serving for support of the fluidizing rings 14. Alternatively, the upper ends of the pipes 13 may be commonly connected by an annular pipe which suitably communicates with the source of compressed air.

Surrounding the pipe 10 at a distance thereto is an essentially cylindrical screening or strainer basket 15 which is mounted to the pipe 10 at its upper converging ends via a collar 19 which is suitably sealed by O-rings 24 and bears against the underside of the bell-shaped body 12. The lower end of the strainer basket 15 is spaced from the suction port 10a of the pipe 10 and is configured in form of a flat cone 15a with downwardly facing apex 15b. As clearly shown in FIGS. 1 and 1A, the strainer basket 15 is arranged in such a manner that the air outlet openings 14a are located laterally outside the strainer basket 15 at a level below the apex 15b of the cone 15a.

Figure 2:
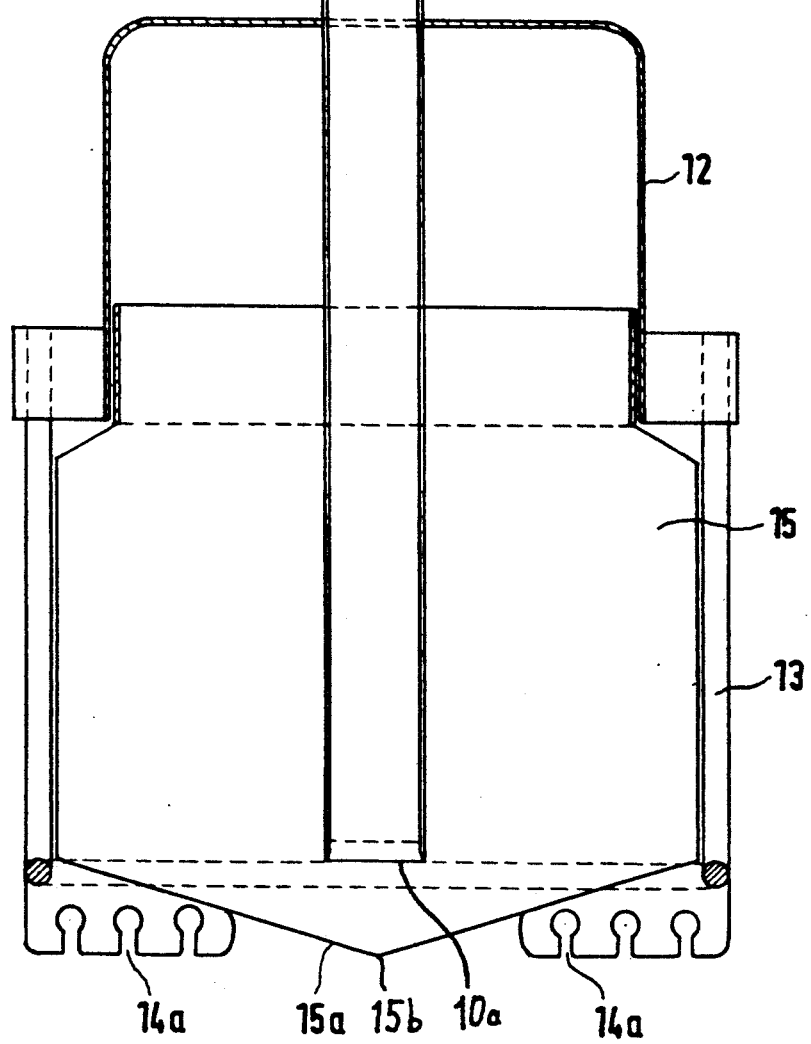
FIG. 2 is a schematic, partly sectional view of the powder fluidizing and transferring apparatus according to FIG. 1, with modified strainer basket and vibration means.

FIG. 2 shows a schematic, partly sectional view of the powder fluidizing and transferring apparatus 100 with modified strainer basket 15 which in contrast to the design of FIG. 1 is mounted with its upper end to the bell-shaped body 12 and is of increased diameter so as to define a considerably larger interior space. The air outlet openings 14a of the fluidizing rings 14 for allowing compressed air to exit are flush or in a line with the apex 15b of the cone 15a and extend below the marginal perimeter area of the strainer basket 15.

The provision of such a comparably large diameter or interior space is especially suited when demanding a very fine-meshed strainer basket as will be explained in more detail furtherbelow.

The powder fluidizing and transferring apparatus 100 in accordance with FIG. 2 differs further from FIG. 1 by the provision of a vibrator 16 which is mounted to the pipe 10 above the bell-shaped body 12. In order to prevent propagation of oscillations, the support plate 11, which centrally retains the pipe 10, is connected via a vibration absorbing padding or buffer 17 with a second support plate 18 and secured by suitable bolts 25. In this case, the support plate 18 may be connected with the support arm of a not shown lifting device or may also be the support arm itself.

Persons skilled in the art will appreciate that although the vibrator 16 is shown only in FIG. 2, the powder fluidizing and transferring apparatus according to FIG. 1 may certainly also be equipped with such a vibrator.

It will also be appreciated by persons skilled in the art that the fluidizing and transferring apparatus of the present invention contains elements which do not appear in the Figures. For example, the suction and transport pipe may be part of a pump or an injector in order to allow withdrawal of the powder from the container and transport to the spray gun. However, these elements are not part of the present invention, and have been omitted from the Figures for the sake of simplicity.

The operation of the powder fluidizing and transferring apparatus according to FIGS. 1 and 2 will now be described with reference to FIG. 2A which shows a schematic illustration on a reduced scale of the powder fluidizing and transferring apparatus according to FIG. 2 in operation within a powder container 20. The powder container 20 has an open top and is filled with powdered material 21. At operation, the powder fluidizing and transferring apparatus 100 which includes pipe 10 (pump or injector), fluidizing rings 14, strainer basket 15 and vibrator 16 is introduced into the powdered material 21 through the open top of the container 20. Compressed air exiting through the air outlet openings 14a of the fluidizing rings 14 causes a locally limited (partial) fluidization of the powder about the immersed part of the powder fluidizing and transferring apparatus 100 so that the fluidized powder flows through the strainer basket 15 toward the suction port 10a and is upwardly transported within the pipe 10. By means of vibrator 16, the strainer basket 15 is caused to vibrate to thereby enhance immersion of the strainer basket 15 into the powdered material 21 and the permeability of the strainer basket 15.

Suitably, a further vibrator 22 is mounted to the exterior of the powder container 20 which thus is placed on vibration absorbing footing 23 to prevent oscillations from propagating. The vibrator 22 causes vibrations of the powdered material 21 to thereby force powder, which is not yet fluidized, especially powder along the lateral perimeter of the powder container (crater edge), to flow to the fluidizing area about the immersed part of the apparatus 100. With increasing powder aspiration, the powder fluidizing and transferring apparatus 100 progressively and automatically lowers itself within the powder container 20.

Operational details and advantages of the unit comprised of the suction and transport pipe 10, compressed air pipe 13 and the fluidizing rings 14 are generally known by persons skilled in the art so that a further description thereof is not necessary.

As set forth above, the strainer basket 15 is spaced from and encloses the lower part of the pipe 10 and the suction port 10a because only then is a clogging of the screen texture avoided. The more fine-meshed the texture of the screen, the greater the dimension of the strainer basket. In case of a medium fine texture, the dimensions of the strainer basket as shown in FIG. 1 may be sufficient; On the other hand, in case of a very fine meshed texture, the strainer basket should be preferably dimensioned in accordance with the embodiment of FIG. 2.

It should be further noted that the location of the air outlet openings 14a of the fluidizing rings 14 relative to the strainer basket 14 should be selected such that the air outlet openings 14a are not disposed within the strainer basket 15 but outside thereof at a level either flush with the lowermost point, i.e. the apex, of the strainer basket as shown in FIG. 2 or immediately therebelow as shown in FIG. 1.

When using a strainer basket with comparably small diameter such as the strainer basket 15 according to FIG. 1, the air outlet openings 14a may be arranged laterally of the strainer basket 15. In the event, however, the strainer basket is of considerable diameter such as the strainer basket 15 according to FIG. 2, it is preferred to arrange the air outlet openings 14a below the marginal perimeter of the strainer basket 15 because an exclusive lateral arrangement of the air outlet openings would result in an unsatisfactory powder fluidization underneath the suction port 10a. By sufficiently dimensioning the strainer basket 15 and suitably arranging the fluidizing rings 14 relative to the strainer basket 15, a clogging of the strainer basket 15 is avoided even over a long operational period.

As set forth above, penetration of powder into the strainer basket 15 can be facilitated by vibrating the strainer basket e.g. by means of vibrator 16 as indicated in FIG. 2. It is not necessary to provide great exciting energies; however, it may be suitable to provide the vibration all-around i.e. there is no predetermined and preferred vibrational direction. This ensures even more a prevention of cloggings of the strainer basket.

Figure 2A:
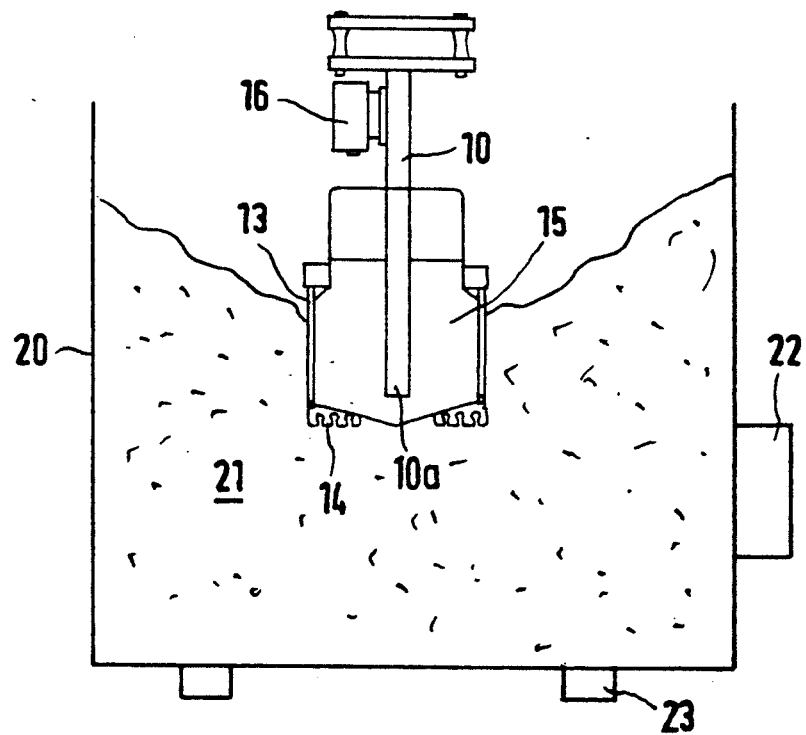
FIG. 2A is a schematic illustration, on a reduced scale, of the powder fluidizing and transferring apparatus of FIG. 2 in operation within a powder container.

As previously mentioned, the vibrator 22 which is shown in FIG. 2A oscillates the powder container 20 with the powdered material 21 to ensure that formation of agglomerations of powder along the marginal perimeter of the container 20 is collapsed to thereby allow feeding of powder also from these areas to the fluidizing region. Extensive tests have shown, however, that in contrast to the desired all-around vibration of the strainer basket 15, an all-around vibration of the powdered material 21 by the vibrator 22 is less desirable as segregation and/or solidification of the powdered material may be encountered because of vertical vibrations. Therefore, it is preferred to operate vibrator 22 in such a manner that the powdered material 21 oscillates only in horizontal direction to ensure a supply of powdered material from the marginal areas towards the fluidizing area without encountering solidifications or segregations.

It has been further shown that interferences can be avoided when vibrating or oscillating the strainer basket 15 and the powdered material 21 at different frequencies. For example, vibrator 22 may oscillate the powdered material 21 at a frequency of 50 Hz while vibrator 16 oscillates the strainer basket 15 at a frequency of e.g. 60 Hz.

Persons skilled in the art will recognize that the vibrators 16 and 22 may be attached also at different locations to attain the desired results. As illustrated in FIG. 2, the vibrator 16 is mounted to the pipe 10 in order to cause vibrations of the entire unit comprised of pipe 10, compressed air pipes 13, fluidizing rings 14 and strainer basket 15. However, it is certainly feasible to vibrate solely the strainer basket by directly mounting the vibrator 16 thereto and by attaching the strainer basket to the pipe via a suitable vibration absorbing padding. The vibrator 22 may be mounted directly to the powder container 20 as shown in FIG. 2A but may certainly be attached also to a receptacle in which the powder container 20 is inserted or to a vibration table which supports the powder container 20.

Turning now to FIG. 3, there is shown a schematic, partly sectional view of the powder fluidizing and transferring apparatus 100 with modified strainer basket which is now configured in form of a flat cylinder with conical end face 15a and conical top 15c. The top 15c is attached to the pipe 10 via a suitably sealed collar 19 in proximity of the suction port 10a. The diameter of the strainer basket 15 corresponds essentially to the strainer basket as shown in FIG. 2, with the fluidizing rings 14 extending below the lateral margins of the strainer basket 15. The strainer basket 15 according to FIG. 3 is especially suited for penetration into the powdered material.

Figure 4:
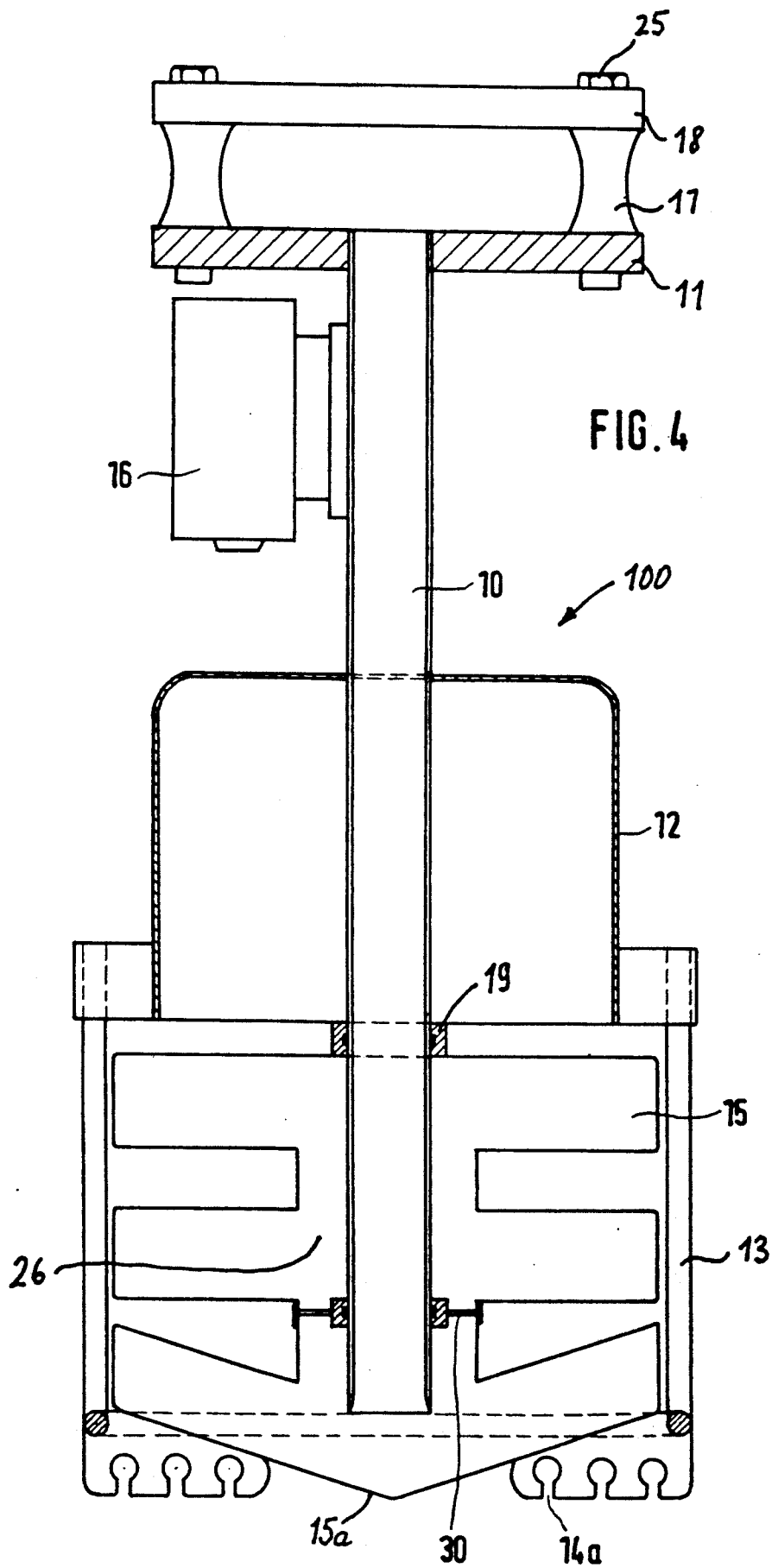
FIG. 4 is a schematic, partly sectional view of the powder fluidizing and transferring apparatus according to FIG. 1 with still another modified strainer basket and vibration means.

In FIG. 4, the strainer basket 15 is characterized by an especially great surface area and configured in form of several "ribs" to resemble the shape of a ribbed radiator. The individual ribs are connected to each other at the rib base 26 which surrounds the pipe 10. The strainer basket 15 according to FIG. 4 is attached to the pipe 10 at its top by the suitably sealed collar 19 and at a lower area via a support 30 in form of lugs so that passage of powdered material to the area about the pipe 10 is ensured.

It will be appreciated by persons skilled in the art that selection of shape and size of the strainer basket is dependant on various conditions and demands. As set forth above, the mesh may be finer with increasing surface area of the strainer basket. For that reason, designs with great surface area, such as e.g. the shape of the strainer basket according to FIG. 4 are very advantageous. There are circumstances, however, which make it unsuitable to render the strainer basket with great dimensions, e.g. when employing the fluidizing and transferring apparatus for conveying powdered material from comparably small containers. Thus, various factors enter the selection of a suitable design for the strainer basket.

At times, it is desired to make available powder fluidizing and transferring apparatuses which include two suction and transport pipes in tandem arrangement for feeding two powder spray guns. Although it may be feasible to provide each of the pipes with a separate strainer basket, such proposal has been proven unsatisfactory especially in those cases in which the pipes are too closely spaced from each other. Therefore, the arrangement of one single strainer basket for both pipes has been found advantageous, as will now be described with reference to FIGS. 5 to 8.

Figure 5:
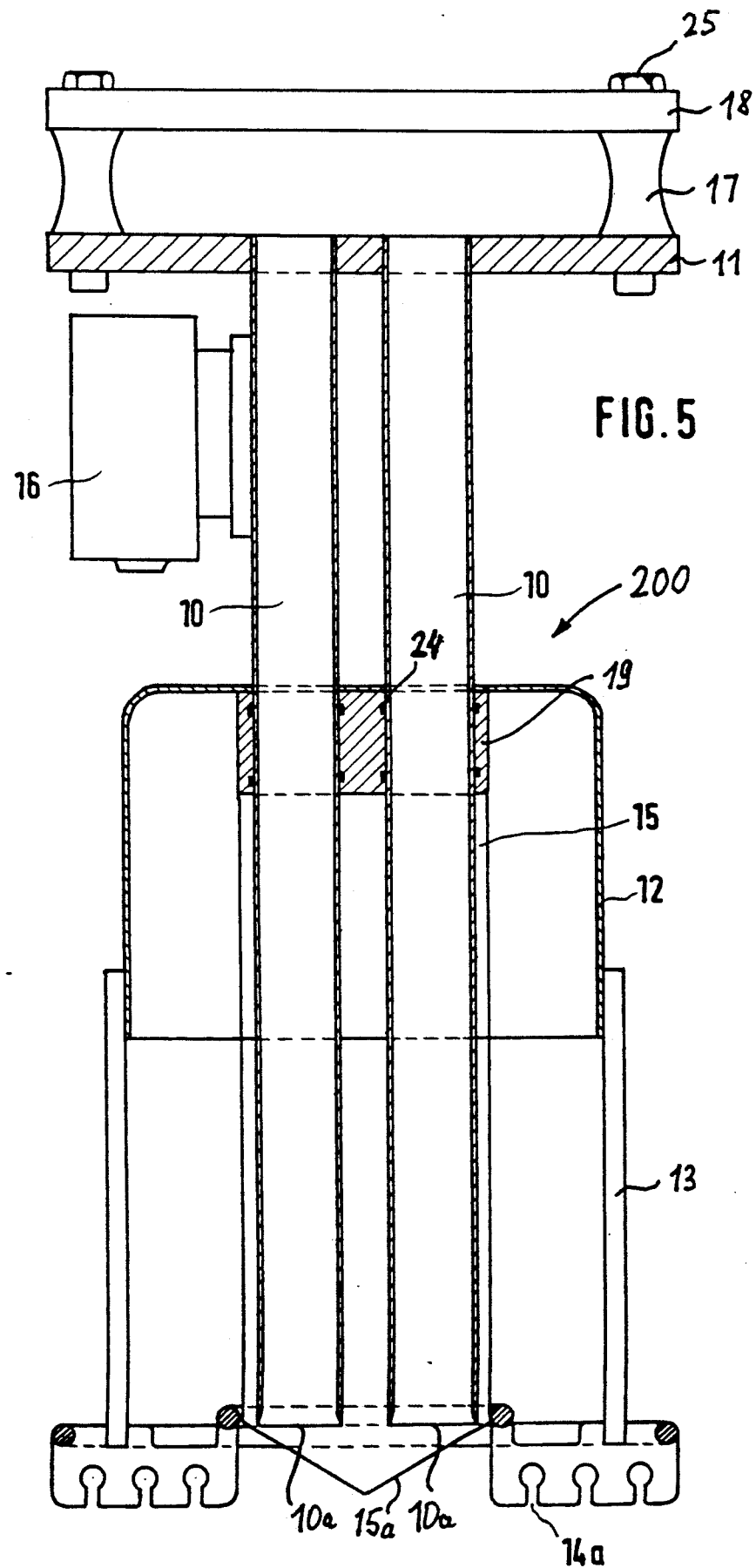
FIG. 5 is a schematic, partly sectional view of a second embodiment of a powder fluidizing and transferring apparatus in accordance with the present invention, illustrating in vertical section the arrangement of two suction and transport pipes with suitable strainer basket.

Turning now to FIG. 5, there is shown a powder fluidizing and transferring apparatus generally designated by reference numeral 200 and including two parallel pipes 10, with each upper end being retained in the support plate 11 and suitably connected to a spray gun. The support plate 11 is acted upon by the vibrator 16 and connected to the second support plate 18 via a padding 17 for absorbing vibrations. The strainer basket 15 corresponds essentially to the strainer basket 15 of FIG. 1 and encloses both pipes 10 at a distance thereto. The strainer basket 15 is mounted to the pipes 10 via a one-piece collar 19 which is suitably sealed by O-rings 24 and bears against the underside of the bell-shaped body 12. As in the embodiment of FIG. 1, the lower end of the strainer basket 15 is configured in form of a flat cone with downwardly facing apex 15b at a distance from the suction port 10a of each pipe 10. The fluidizing rings 14 extend outside the strainer basket 15, with their air outlet openings 14a extending below the apex 15b of the flat cone 15a.

Figure 6:
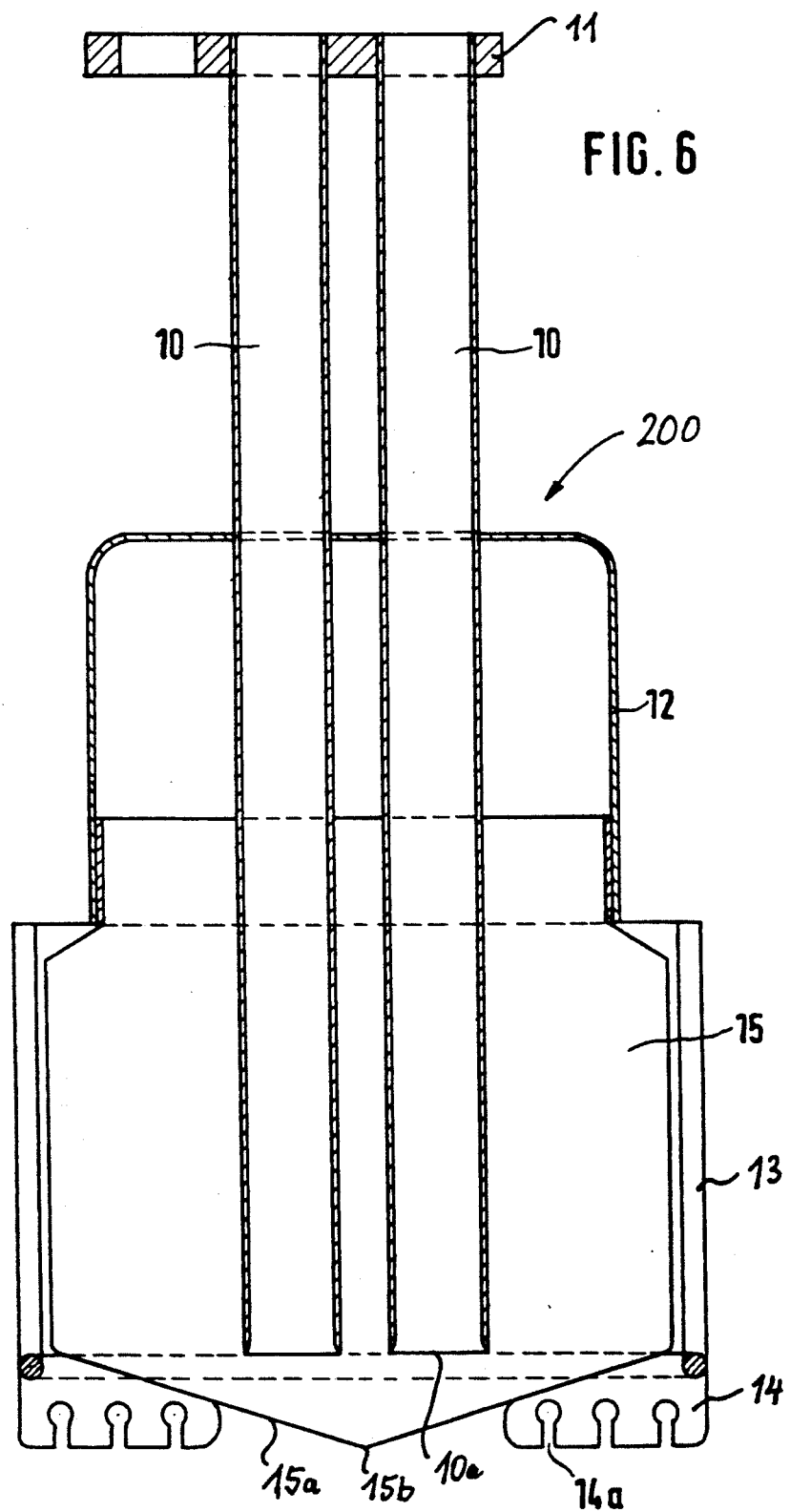
FIG. 6 is a schematic, partly sectional view of the powder fluidizing and transferring apparatus according to FIG. 5 with modified strainer basket.
Figure 7:
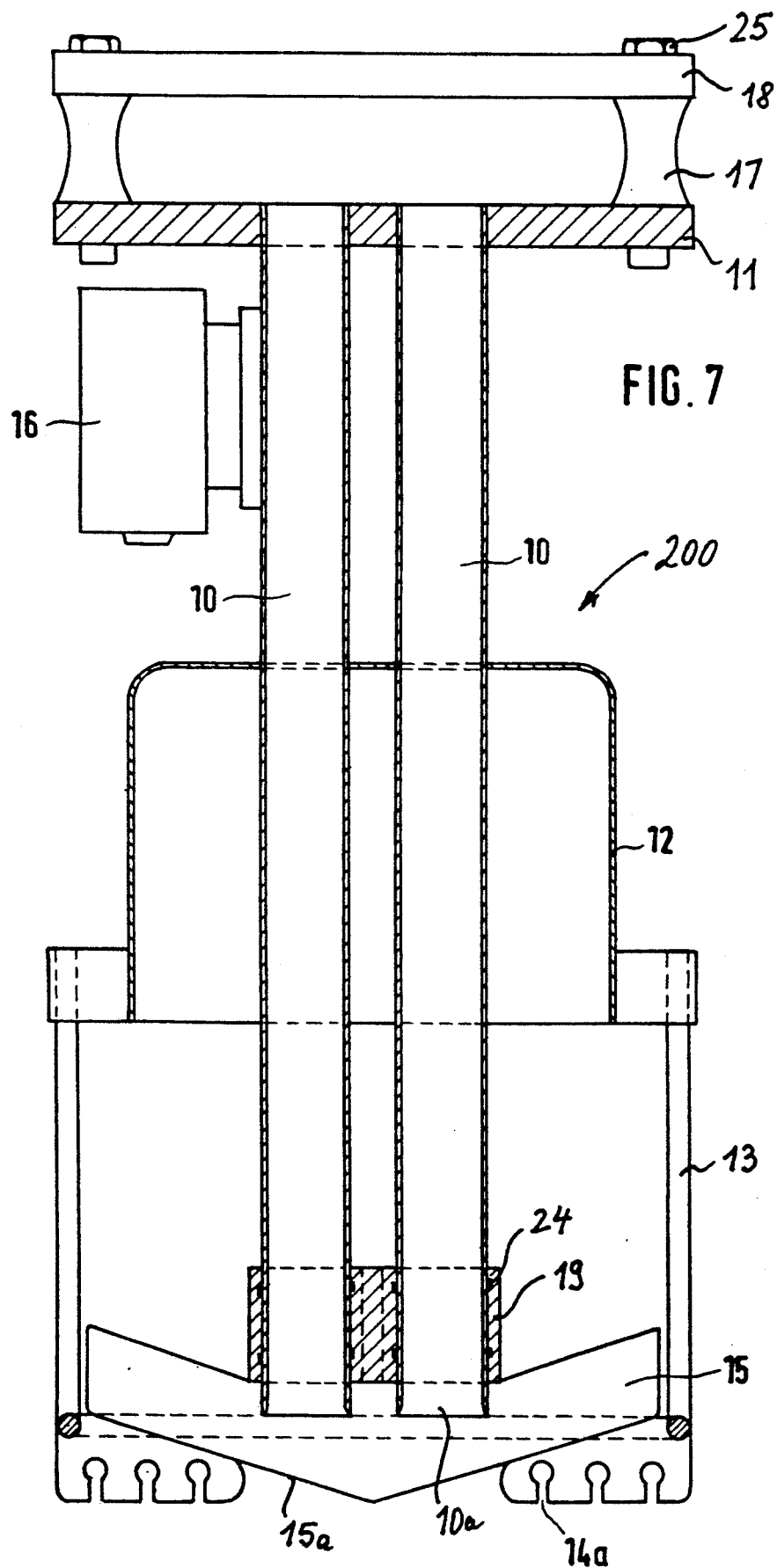
FIG. 7 is a schematic, partly sectional view of the powder fluidizing and transferring apparatus according to FIG. 5 with yet another modified strainer basket.
Figure 8:
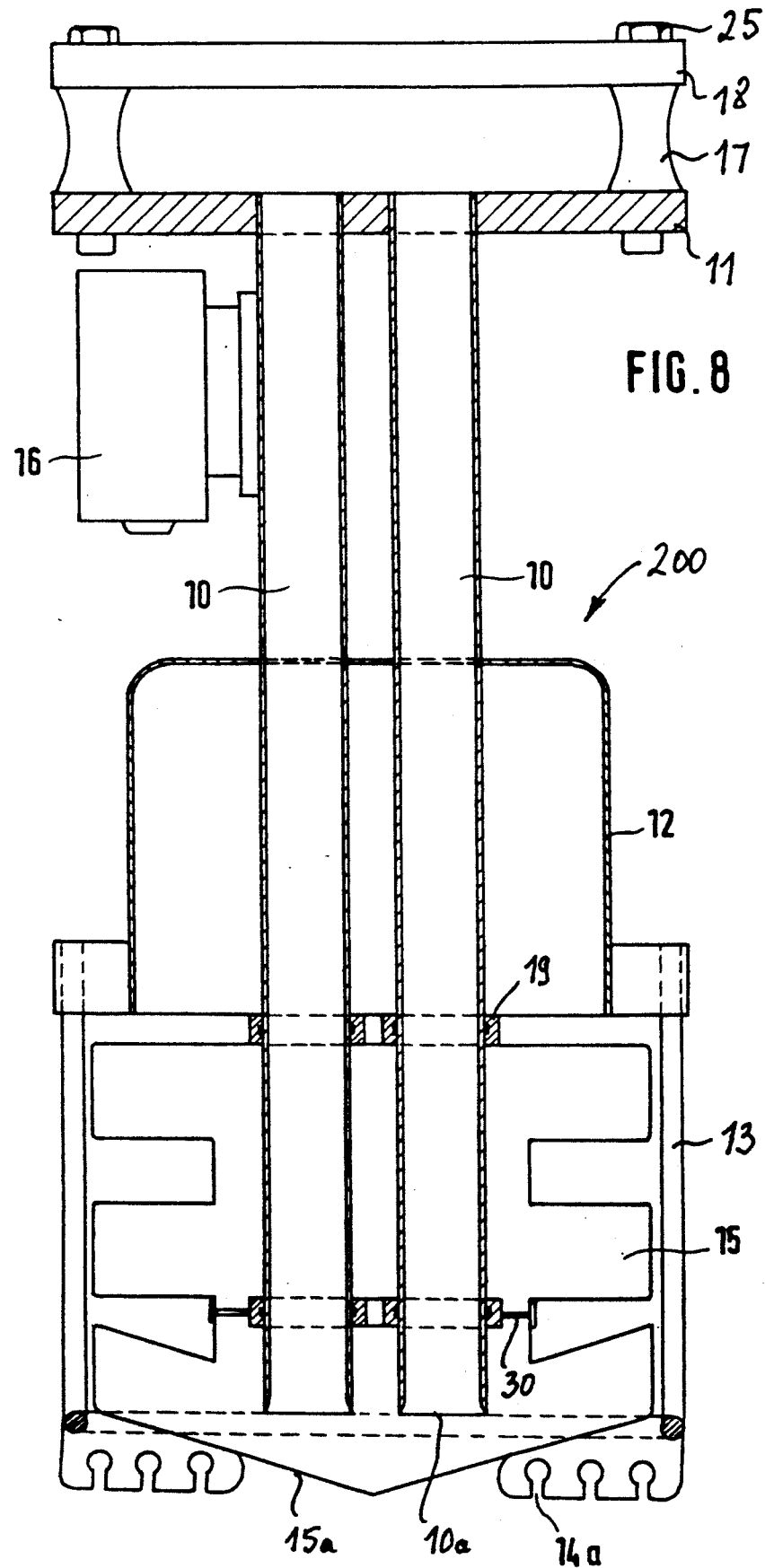
FIG. 8 is a schematic, partly sectional view of the powder fluidizing and transferring apparatus according to FIG. 5 with still another modified strainer basket.

FIG. 6 shows the powder fluidizing and transferring apparatus 200 with pipes 10 in tandem arrangement which are enclosed by a strainer basket 15 in correspondence with the design as shown in FIG. 2. In FIG. 7, the design of the strainer basket 15 corresponds to the strainer basket as illustrated in FIG. 3 while FIG. 8 shows a strainer basket 15 corresponding to the design as shown in FIG. 4. Since these figures are self-explanatory, a detailed description thereof is not necessary.

Figure 9:
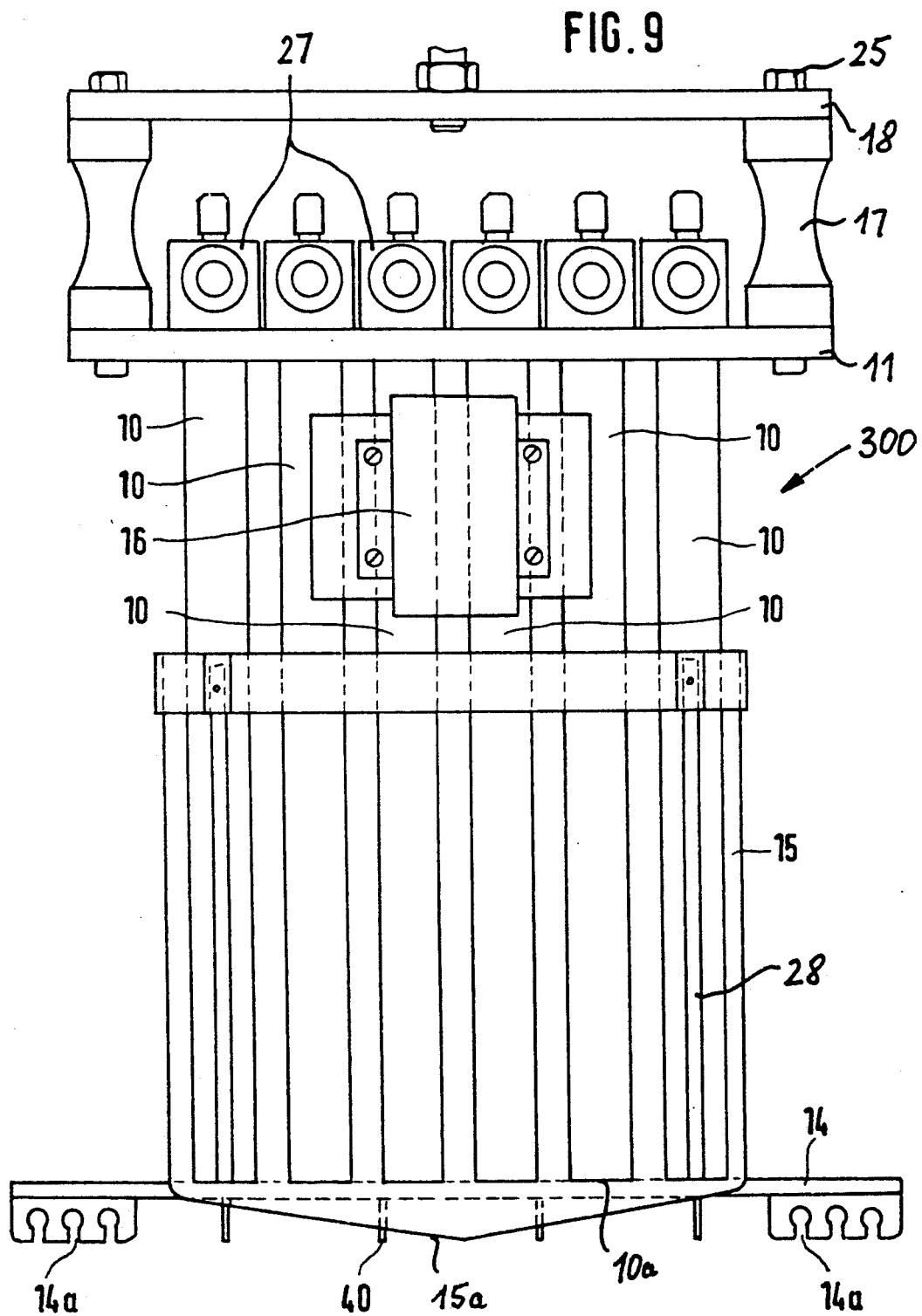
FIG. 9 is a schematic, partly sectional view of a third embodiment of a powder fluidizing and transferring apparatus in accordance with the present invention, illustrating in particular in vertical section the arrangement of six suction and transport pipes with suitable strainer basket.

Turning now to FIG. 9, there is shown an embodiment of a powder fluidizing and transferring apparatus for powdered material, generally designated by reference numeral 300 and including six suction and transport pipes 10, with their upper end being retained in the support plate 11. The six pipes 10 are together enclosed or surrounded by a single strainer basket 15 which is thus of relatively great diameter so that the selection of arrangement of the fluidizing rings 14 and the air outlet openings 14a is of particular importance. In the embodiment of the powder fluidizing and transferring apparatus 300 according to FIG. 9, the fluidizing rings 14 extend laterally outside of the strainer basket 15, with the air outlet openings 14a being in alignment with the apex 15b of the conical lower end face of the strainer basket 15. For creating an even fluid bed and a uniform transport of powdered material through the six pipes, additional guide plates 40 are provided.

In the embodiment of FIG. 9, the pipes 10 are arranged parallel to each other in side-by-side arrangement so that the strainer basket 15 is of complementary, elongated elliptic cross section and mounted to the pipes 10 via a suitably sealed collar 19. The powder fluidizing and transferring apparatus 300 is especially suited for supply of coating cabins with a greater number of spray guns.

It will be appreciated that it is certainly also feasible to arrange the pipes 10 in form of a bundle so that the strainer basket will then be configured in form of a circular cylinder.

Suitably, the powder fluidizing and transferring apparatus 300 is provided with a vibrator such as vibrator 16 which acts upon the pipes 10 to cause vibrations thereof. The support plate 11 which retains the upper ends of the pipes 10 is connected to the second support plate 18 via a padding 17 for absorbing vibrations. For allowing individual supply of powder to the spray guns, the connection of each pipe 10 to the pertaining spray gun is controlled by a valve unit 27. FIG. 9 further shows support rods 28 which provide stability of and support for the strainer basket 15 and are suitably mounted to the collar 19.

Apart from possible modifications of the shape, size and arrangement of the strainer basket and the arrangement of the vibrators, it is also possible to separate the suction and transport pipe 10 from the unit comprised of strainer basket 15 and fluidizing unit 13, 14, 14a. In this case, this unit can be introduced into the powdered material first and subsequently the pipe or pipes 10 may then be separately inserted.

While the invention has been illustrated and described as embodied in an apparatus for fluidizing and transferring powdered material, it is not intended to be limited to the details shown since various modifications and structural changes may be made without departing in any way from the spirit of the present invention.

What is claimed as new and desired to be protected by Letters Patent is set forth in the appended claims:

1. Apparatus for fluidizing powdered material within a container and transferring fluidized powder to a spray gun of an electrostatic powder coating plant; comprising:
   at least one suction and transport pipe immersible from above into the container and having a suction port;
   fluidizing means for generating a locally limited powder fluid bed within the container;
   screening means enclosing the immersing portion of said pipe and its suction port at a distance thereto; and
   first vibrating means for causing oscillations of said screening means.

2. Apparatus as defined in claim 1 wherein said fluidizing means includes a compressed air pipe provided with air outlet openings, said air outlet openings being arranged laterally outside of said screening means.

3. Apparatus as defined in claim 1 wherein said fluidizing means includes a compressed air pipe provided with air outlet openings, said air outlet openings being arranged below said screening means.

4. Apparatus as defined in claim 1 wherein said fluidizing means includes a compressed air pipe provided with air outlet openings, said air outlet openings being arranged laterally outside of and below said screening means.

5. Apparatus as defined in claim 1, and further comprising fastening means for mounting said screening means to said suction and transport pipe.

6. Apparatus as defined in claim 1 wherein said suction and transport pipe, said fluidizing means and said screening means are integrated to a unit.

7. Apparatus as defined in claim 1 wherein said screening means is a cylindrical strainer basket with conical base, with its apex facing downwardly.

8. Apparatus as defined in claim 1 wherein said screening means is a strainer basket with rugged surface area.

9. Apparatus as defined in claim 8 wherein said strainer basket is ribbed.

10. Apparatus as defined in claim 1 wherein said screening means includes a strainer basket with suitable mesh, said strainer basket having a volume which is in inverse ratio to the fineness of said mesh.

11. Apparatus as defined in claim 1, and further comprising attenuation means for absorbing vibrations generated by said first vibrating means.

12. Apparatus as defined in claim 1, including a plurality of parallel suction and transport pipes, said screening means including one single strainer basket surrounding said plurality of suction and transport pipes.

13. Apparatus as defined in claim 1, and further comprising second vibrating means for causing horizontal oscillations of the powdered material.

14. Apparatus as defined in claim 1, and further comprising second vibrating means for causing horizontal oscillations of the powdered material at a suitable oscillating frequency, said first vibrating means oscillating said screening means at a frequency which differs from the oscillating frequency of the powdered material.

15. Apparatus as defined in claim 7 wherein said fluidizing means includes a compressed air pipe provided with air outlet openings, said apex of said conical base extending flush with said air outlet openings.

16. Apparatus as defined in claim 7 wherein said fluidizing means includes a compressed air pipe provided with air outlet openings which extend below said apex of said conical base.

17. Apparatus for fluidizing powdered material within a container and transporting fluidized powder to a processing device such as a spray gun of an electrostatic powder coating plant; comprising:

a suction and transport pipe adapted for introduction into the container and having a lower end defining a suction port;

fluidizing means for generating a powder fluid bed within the container about said suction port for allowing withdrawal of powdered material;

screening means enclosing a suitable portion of said pipe and said suction port at a distance thereto for allowing supply of screened powdered material to the processing device; and first vibrating means for causing oscillations of said screening means.

18. Apparatus for fluidizing powdered material within a container and transferring fluidized powder to a spray gun of an electrostatic powder coating plant; comprising:

at least one suction and transport pipe immersible from above into the container and having a suction port;

fluidizing means for generating a locally limited powder fluid bed within the container, said fluidizing means including a compressed air pipe provided with air outlet openings;

screening means enclosing the immersing portion of said pipe and its suction port at a distance thereto, with said air outlet openings being arranged outside said screening means; and first vibrating means for causing oscillations of said screening means.

* * * * *